United States Patent
Kerber

(10) Patent No.: US 9,390,239 B2
(45) Date of Patent: Jul. 12, 2016

(54) SOFTWARE SYSTEM TEMPLATE PROTECTION

(71) Applicant: Hannes Kerber, Mannheim (DE)

(72) Inventor: Hannes Kerber, Mannheim (DE)

(73) Assignee: SAP SE, Walldorf (DE)

( * ) Notice: Subject to any disclaimer, the term of this patent is extended or adjusted under 35 U.S.C. 154(b) by 144 days.

(21) Appl. No.: 14/137,912

(22) Filed: Dec. 20, 2013

(65) Prior Publication Data

US 2015/0178483 A1 Jun. 25, 2015

(51) Int. Cl.
*G06F 7/04* (2006.01)
*G06F 21/12* (2013.01)
*H04W 4/00* (2009.01)
*G06F 9/445* (2006.01)

(52) U.S. Cl.
CPC ........ *G06F 21/12* (2013.01); *G06F 8/65* (2013.01); *H04W 4/001* (2013.01)

(58) Field of Classification Search
CPC ........... G06F 21/12; G06F 8/65; H04W 4/001
USPC ................................................. 726/30
See application file for complete search history.

(56) References Cited

U.S. PATENT DOCUMENTS

| | | | |
|---|---|---|---|
| 5,933,646 A * | 8/1999 | Hendrickson et al. | ........ 717/169 |
| 5,991,877 A | 11/1999 | Luckenbaugh | |
| 7,065,537 B2 | 6/2006 | Cha et al. | |
| 7,222,369 B2 | 5/2007 | Vering et al. | |
| 7,349,929 B2 | 3/2008 | Pfitzner | |
| 7,350,237 B2 | 3/2008 | Vogel et al. | |
| 7,467,198 B2 | 12/2008 | Goodman et al. | |
| 7,519,570 B2 | 4/2009 | Wing et al. | |
| 7,693,731 B1 | 4/2010 | Weber et al. | |
| 7,711,694 B2 | 5/2010 | Moore | |
| 8,058,968 B2 | 11/2011 | Hirano et al. | |
| 8,185,643 B2 | 5/2012 | McMullen et al. | |
| 8,566,815 B2 * | 10/2013 | Schaefer et al. | ............. 717/168 |
| 8,725,134 B2 * | 5/2014 | Zou et al. | ...................... 455/419 |
| 2002/0199123 A1 | 12/2002 | McIntyre et al. | |

(Continued)

FOREIGN PATENT DOCUMENTS

EP 1210661 A2 6/2002
WO WO-2012094482 A1 7/2012

OTHER PUBLICATIONS

"European Application Serial No. 14197808.0, Search Report mailed May 4, 2015", 4 pgs.

(Continued)

*Primary Examiner* — Mohammad W Reza
(74) *Attorney, Agent, or Firm* — Schwegman Lundberg & Woessner, P.A.

(57) ABSTRACT

Various embodiments herein are in the form of at least one of systems, methods, and software for software system template protection. With the help of software system template protection, developments, configurations, and information technology (IT) infrastructure setup can be protected and controlled in an efficient manner during the change process, while building and configuring applications and IT Infrastructure as well during the whole Application Lifecycle Management process. When changes are made in an instance of a software system deployment, prior to committing (i.e., storing) the changes, a change management service is called to determine whether such changes are allowed in view of one or more templates deployed to the instance of the software system and change restrictions associated therewith.

18 Claims, 5 Drawing Sheets

(56) References Cited

U.S. PATENT DOCUMENTS

| | | |
|---|---|---|
| 2007/0112574 A1 | 5/2007 | Greene |
| 2007/0233508 A1 | 10/2007 | Gillespie |
| 2008/0281666 A1 | 11/2008 | Kessman et al. |
| 2009/0298511 A1 | 12/2009 | Paulson |
| 2010/0058170 A1 | 3/2010 | Demant et al. |
| 2011/0289499 A1* | 11/2011 | Haubold et al. ............. 717/173 |
| 2012/0117181 A1 | 5/2012 | Patel et al. |
| 2013/0066752 A1 | 3/2013 | Huizenga et al. |
| 2013/0210417 A1* | 8/2013 | Zou et al. ...................... 455/419 |

OTHER PUBLICATIONS

Shim, Simon S.Y., et al., "Business-to-Business E-Commerce Frameworks", (2000), 40-47.

* cited by examiner

SOFTWARE SYSTEM TEMPLATE PROTECTION

BACKGROUND INFORMATION

Large companies operate very complex information technology (IT) system landscapes and perform developments on their own to further enhance their IT solutions that support their business processes. To streamline this approach, so called templates are developed centrally, containing developments and configuration, in a separated environment and rolled out to subsidiaries, divisions, and the like to support the business processes in a common way.

In the subsidiaries and divisions, these processes are localized, or adjusted, due to differing regional and local requirements, such as may arise through regional and local legal requirements, accounting standards, customs, and the like. For this purpose separate instances of IT systems are often implemented for such purposes and as a result, the centrally developed templates are changed However, development of templates is typically an expensive endeavor in terms of money, time, and resources. Further, departure from the templates may further increase expense in local development and maintenance effort and can result in data and process divergence across the broader enterprise of a large company.

DETAILED DESCRIPTION

Figure 1:
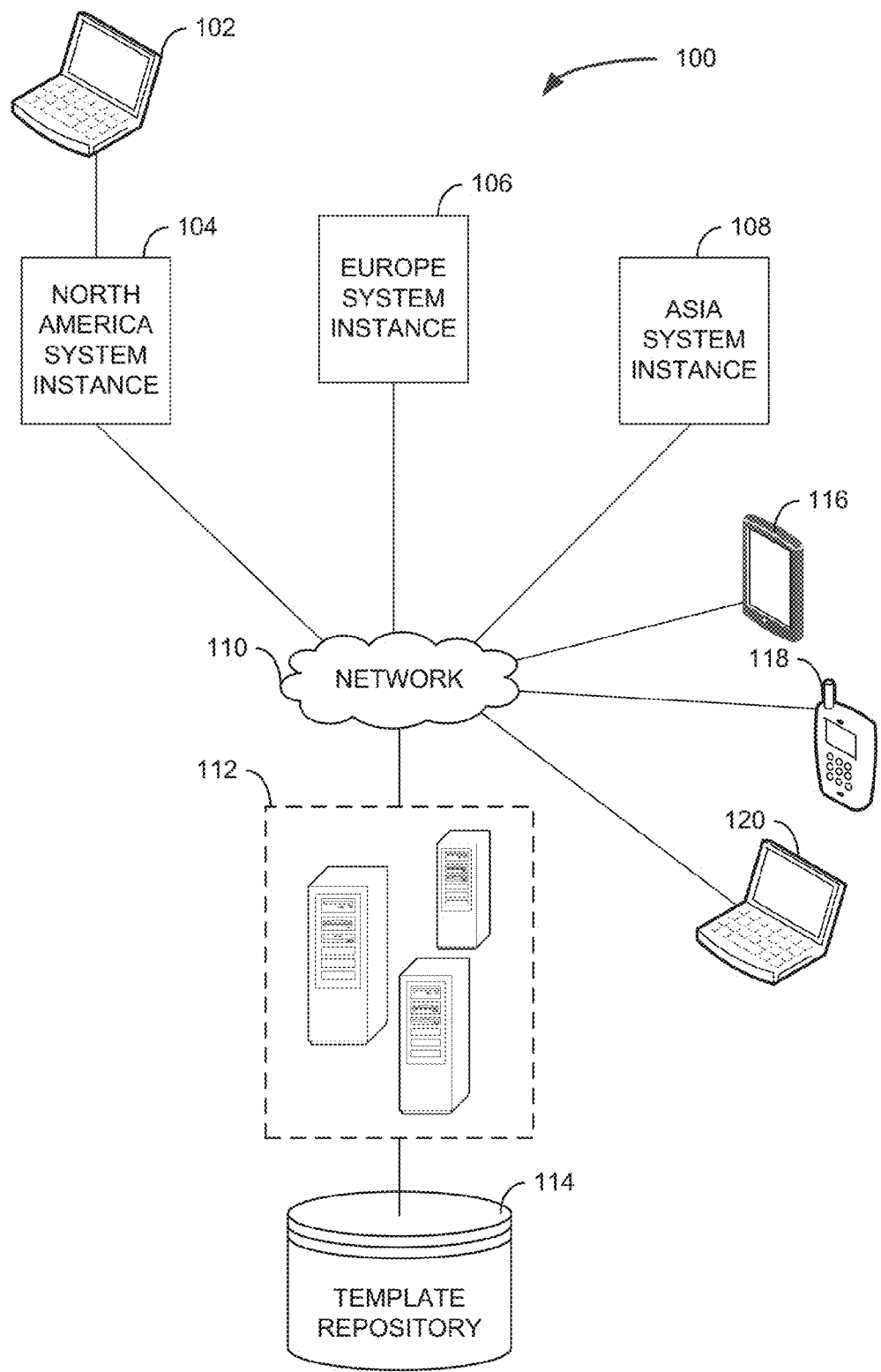
FIG. 1 is a logical block diagram of a system, according to an example embodiment.

Various embodiments herein are in the form of at least one of systems, methods, and software for software system template protection. With the help of software system template protection, developments, configurations, and information technology (IT) infrastructure setup can be protected and controlled in an efficient manner during the change process, while building and configuring applications and IT Infrastructure as well during the whole Application Lifecycle Management process. When changes are made in an instance of a software system deployment, prior to committing (i.e., storing) the changes, a change management service is called to determine whether such changes are allowed in view of one or more templates deployed to the instance of the software system and change restrictions associated therewith.

Such embodiments provide a technical solution to prevent undocumented and unapproved changes from being made to any of the mentioned elements. Technical entities, down to table entry level such as with regard to configuration settings, may be protected and cannot be changed in localization environment of an instance of a software system. The change management service provides a central control mechanism that is called whenever an actual change is to be made. These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is an example of a system within which software system template protection may be deployed. The system 100, in the example embodiment, includes a set of servers 112 that may include a central change management software system, such as Solution Manager available from SAP AG of Walldorf, Germany. The central change management software system provides functionality to restrict, based on software system templates, changes made in various software system instances 104, 106, 108 that an enterprise that maintains the system 100 has deployed.

The software system instances are generally instances 104, 106, 108 of an enterprise management software system, such one or more of an enterprise resource planning (ERP), human resources management (HRM), customer relationship management (CRM), or other such system. Although three software system instances 104, 106, 108 are illustrated, other embodiments may include only a single instance while other embodiments may include two instances and more than three instances of the software system. The software system instances 104, 106, 108 are generally instances of the same software system, such as each of the instances is an instance of the same ERP system. However, each instance may be deployed for a different purpose or for servicing a business entity of the enterprise, such as a subsidiary, division, or localized business unit that services a specific geographic region. As illustrated, the software system instances 104, 106, 108 are each deployed to service specific geographic regions (i.e., software system instance 104 is deployed to service North America, software system instance 106 is deployed to service Europe, and software system instance 108 is deployed to service Asia).

Each software system instance 104, 106, 108 may be deployed to unique computing devices, such as enterprise-class servers or virtual machines. However, in some embodiments, the set of servers 112 may host one or more, or even all, of the software system instances 104, 106, 108.

The enterprise management software system instances 104, 106, 108, when deployed on unique computing devices, may be connected to the set of servers 112 via a network 110. The network 110 may be one or both of a wired and wireless network providing connectivity to one or more of a local area network, a wide area network, the Internet, a virtual private network, a value added network, and other network types. Also connected to the network 110 may be various computing devices, such as tablets 116, smartphones 118, and personal computers 120. Such computing devices may provide client programs, apps, and browser-based clients to allow user interaction with the software system instances 104, 106, 108.

As each software system instance 104, 106, 108 is deployed to service different business entities of an enterprise and such entities may operate in different geographic regions, each software system instance 104, 106, 108, although an instance of the same software system, may need to be configured differently, include unique functionality, and the like due to legal requirements, local customs and best practices, industry standards, and the like. However, as each software system instance 104, 106, 108 is deployed as part of the larger system 100 of a parent enterprise, maintaining consistency between each software system instance 104, 106, 108 is important to minimize development, deployment, and maintenance costs in terms of money, resources, and time. At the same time, each software system instance 104, 106, 108 must flex to meet the unique needs and requirements of its respective business unit.

Figure 2:
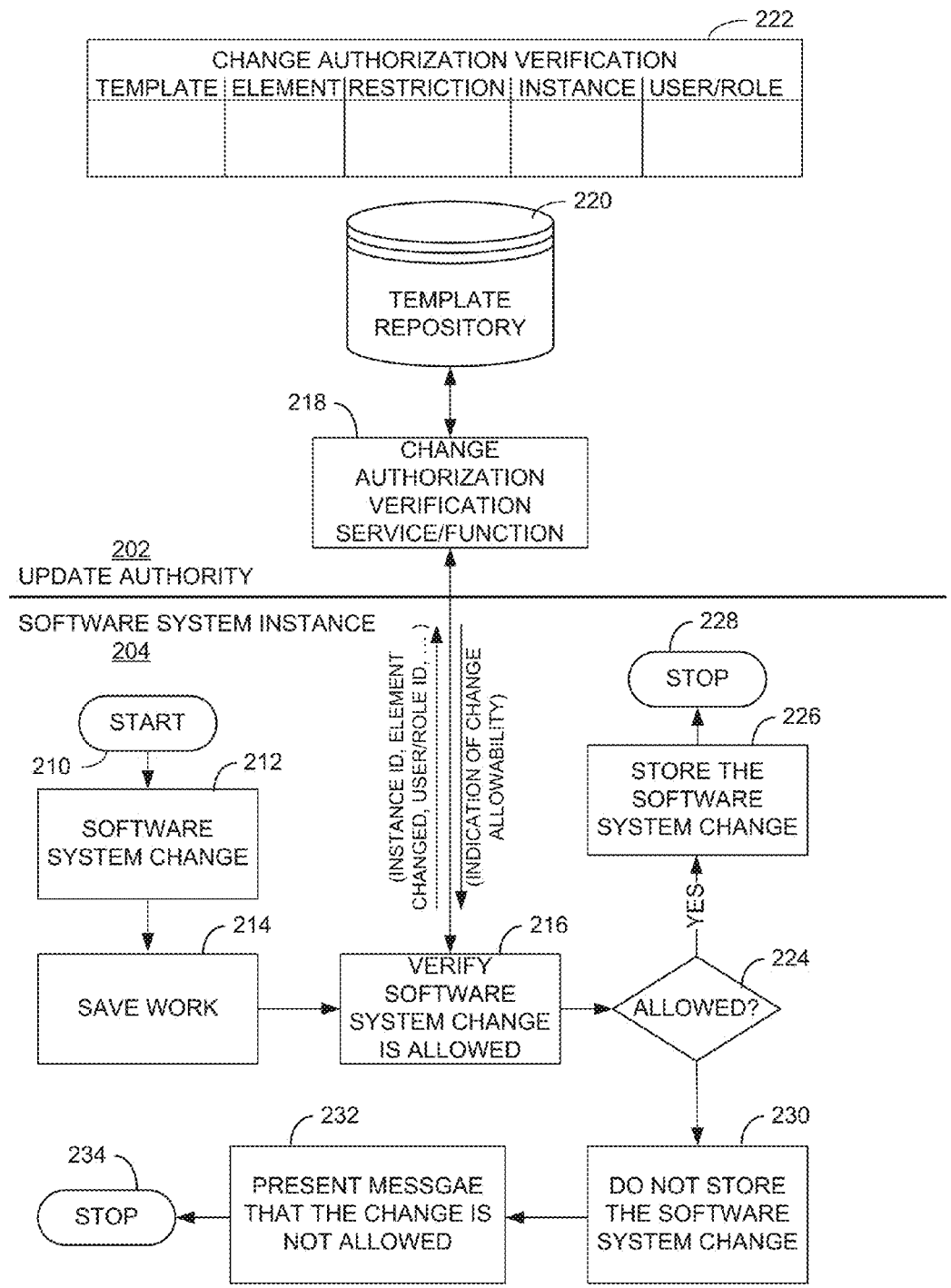
FIG. 2 is a flow diagram of a method according to an example embodiment.

Software system templates are developed and implemented to preserve software system instance 104, 106, 108 with centrally developed forms of the software system, such as with regard to accounting practices, business processes, correspondence, data formats, and software system instance 104, 106, 108 configurations. Software system templates include such items and can be deployed to the various software system instances 104, 106, 108. At the same time, a template repository 114 stores the templates and permission data associated therewith. When an update is to be performed with regard to an element of one of the software system instances 104, 106, 108, prior to committing (i.e., storing) the update, the respective software system instance, or a module or other programmatic element associated therewith, requests update permission from the central change management system that is present on the set of servers 112. The request may include one or more identifiers of software system elements that are being updated. In some embodiments, the request may further include one or more of an updated value of each element being updated, an identifier of the software system instance 104, 106, 108 being updated, an identifier of the user attempting to perform the update, and other such data. The central change management system then utilizes that data to determine whether the update is allowed based on templates and associated permission data stored in the template repository. When the update is with regard to software system elements that are not a part of a template, with regard to elements that are not update restricted, or with regard to elements that are update restricted but the requesting user has authority to make the update, the update may be allowed and a message is returned to the requestor indicating the allowability and the update will be committed. When the update is with regard to software system elements that are part of a template and update of one or more of the updated elements is not allowed at all or at least not allowed by the particular requesting user, a message is returned to the requestor denying permission to perform the update. The user may be presented with a message indicating the update is not allowed, and when the message includes data identifying the updated elements for which updates are not allowed, such data may also be presented. In some further embodiments, a user may be presented with an option to create a change request based on the attempted update. The change request, if created, will then be received by the central change management system and processed. FIG. 2 provides further detail with regard to the receiving and processing of software system updates.

FIG. 2 is a flow diagram of a method 200 according to an example embodiment. The method 200 is an example of a method that may be performed to verify a software system instance update is authorized prior to commitment of the change. The method 200, as illustrated includes a software system instance 204 and an update authority 202. The software system instance 204 is an example of a portion of one or more of the system instances 104, 106, 108 of FIG. 1. The update authority 202 is an example of a portion of a change management software system, such as may be deployed on the set of servers 112, also of FIG. 1.

The example method 200 starts 210 by receiving a software system change 212 and an attempt to save the work 214 of the software system change 212. The software system change 212 may be or include a modification or addition to program code, a change to a business process, a change of a software system configuration, and virtually any other possible addition to, update of, or deletion of a portion of the software system instance 204.

When a developer, administrator, or other user to save the work 214 of the software system change 212, the software system instance 204 or a software tool being used to make the software system change 212, verifies the software system change 212 is allowed 216. To verify the software system change 212 is allowed 216, a call is made to a service or function 218 of the update authority 202. The service or function 218 may be called through a remote function call, a call of a web service, or other type of request or message that may be communicated over a network or otherwise between systems. The call may include various data elements representative of the software system change 212, such as an identifier of the software system instance 204 to which the software system change 212 is being attempted, an identifier of one or more elements of the software system instance 204 being changed, a user identifier or an identifier of a role of the user attempting to make the software system 204 change 212, and potential other data elements, depending on the particular embodiment.

The change authorization verification service or function 218, upon receipt of the call to verify the software system change is allowed 216, performs a determination of whether the software system change 212 is allowed. The determination, in some embodiments, is made based on data stored in a template repository 220. The template repository 220, as with the template repository 114 of FIG. 1, stores templates and permission data associated therewith. For example, the permissions data may be stored in a change authorization verification table 222 or one or more other tables including similar data, amongst other possible data.

In the change authorization verification table 222, which is stored in the template repository 220, various data elements are stored. As illustrated, the data stored in the change authorization verification table 222 includes rows of data, each row including data identifying a template, an element of the template (e.g., configuration setting identifiers, code elements or objects, user interface definitions, data fields, data types, and the like), and a type of restriction (e.g., locked, conditionally modifiable based on a user or role of a user making the change, no restriction, etc.). Each row of the change authorization verification table 222 may further include a software system instance identifier and a user identifier or role identifier to which the row of data applies. Thus, as is readily ascertainable, each template, element, software system instance, and user or user role may include zero to many rows of data in the change authorization verification table 222.

Thus, based on the data received in the call of the change authorization verification service or function 218, a call is made to retrieve one or more relevant rows of data from the change authorization verification table 222. Based on the retrieved rows of data, which may include a NULL set of rows, the determination of whether the software system change 212 is allowed. When a NULL set of rows are retrieved or if the rows retrieved reveal that there are no restrictions preventing the software system change 212, a message is generated and returned to the software system instance 204 indicating that the change is allowed and can be saved. However, if any rows provide data resulting in a determination that the change is not allowed, a message is generated and returned to the software system instance 204 indicating that the change is not allowed. The message returned when the change is not allowed may also include additional data identifying one or more changed software system instance 204 elements that are not allowed to be changed.

The message is received back in the software system instance 204 and a determination 224 is made there, based on the received message, whether the software system change 212 is allowed. When the change is allowed, the method stores 226 the change and the method stops 228. However, when the determination 224 is that the software system change 212 is not allowed, the change is not stored and typically, a message is presented 232 indicating the change is not allowed. The method then ends. However, in some embodiments, such as when the message returned by the change authorization verification service or function 218 includes data identifying the one or more changed software system instance 204 elements that are not allowed to be changed, the message presented 232 includes a representation of, or a selectable option to view, the offending software system instance 204 elements that cannot be changed.

Figure 3:
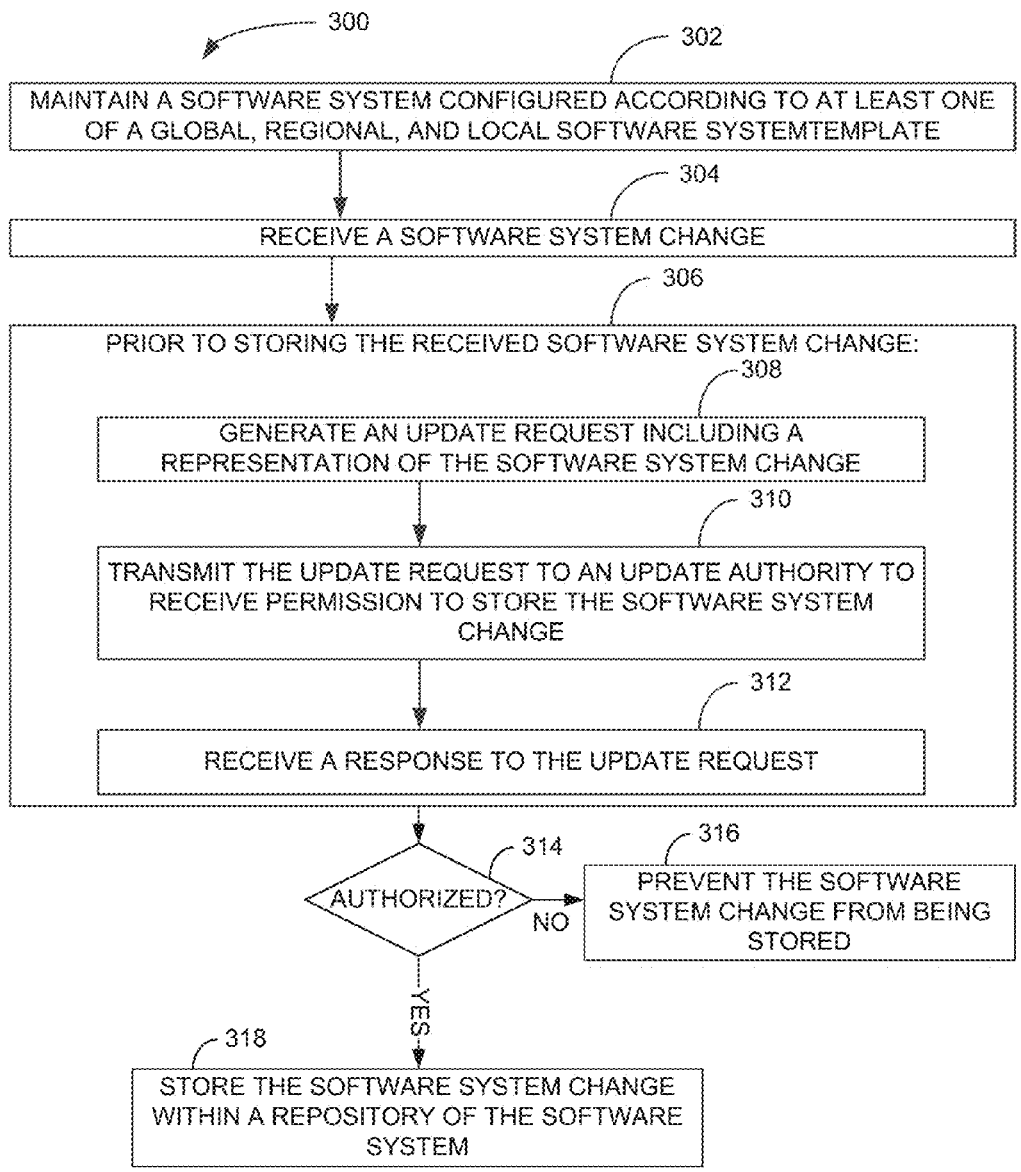
FIG. 3 is a block flow diagram of a method, according to an example embodiment.

FIG. 3 is a block flow diagram of a method 300, according to an example embodiment. The method 300 is an example of a method that may be performed by a software system instance, such as one of the software system instances 104, 106, 108 of FIG. 1, the software system instance 204 of FIG. 2, or a software tool that can be used to make software system changes.

The method 300 includes maintaining 302 a software system configured according to at least one of a global, regional, and local software system template. As described earlier, a software system may be deployed in, or deployed to service, many different regions. Thus, a global software system template is a template that is deployed to software system instances regardless of locale where the system is located or a locale to be serviced by the system. Similarly, regional and local software system templates are templates developed for specific regions or locales, respectively.

The method 300 further includes receiving 304 a software system change including a change or addition to at least one of configuration data, programming, and content of the software system. Prior to storing 306 the received software system change, the method 300 generates 308 an update request including a representation of the software system change and transmits 310 the update request via a network to an update authority to receive permission to store the software system change. A message is then received 312 via the network in response to the update request. When the response to the update request includes an indication the software system change is not authorized, the method 300 prevents 316 the software system change from being stored. When the response to the update request includes an indication the software system change is authorized, the method 300 includes storing 318 the software system change within a repository of the software system.

In some embodiments, prior to storing 306 the received software system change and prior to generating 308 the update request, the method 300 further includes determining the software system change is not with regard to the at least one of the global, regional, and local software system template. In such instances, the software system change is stored within the repository of the software system and the method ends.

Figure 4:
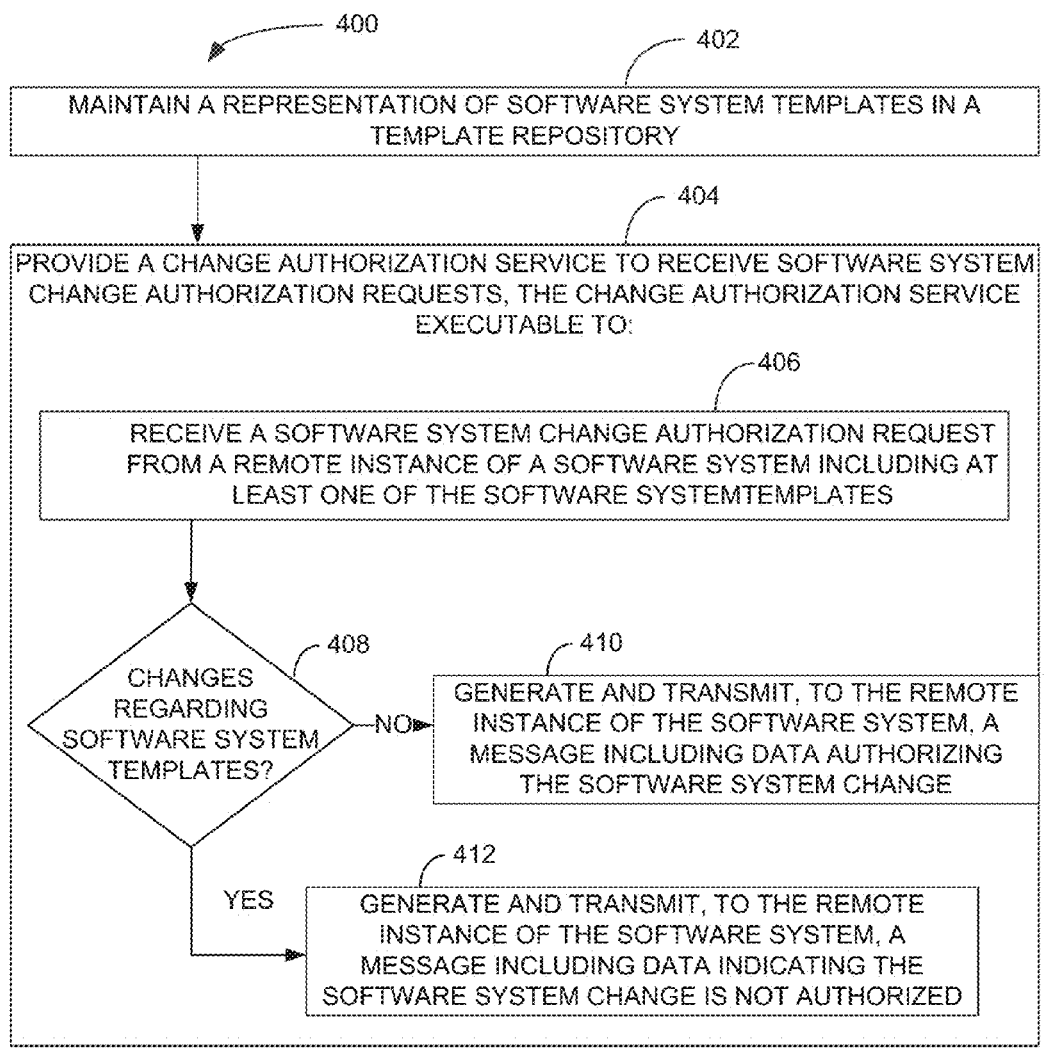
FIG. 4 is a block flow diagram of a method, according to an example embodiment.

FIG. 4 is a block flow diagram of a method 400, according to an example embodiment. The method 400 is an example of a method that may be performed by an update authority, such as update authority 202 of FIG. 2.

The method 400 includes maintaining 402 a representation of software system templates in a template repository. In some embodiments, each of the software system templates includes a representation of a set of software system elements and permissions associated therewith that restrict changes with regard to elements of the respective sets of software system elements.

The method 400 further includes providing 404 a change authorization service, accessible via a network, such that the change authorization service may be called by remote software system instances to verify whether software system changes may be stored. For example, the change authorization service is executable to receive 406 a software system change authorization request from a remote instance of a software system that may include at least one of the software system templates. The software system change request will typically include a representation of a software system change desired to be made within the remote instance of the software system. The method 400 may then determine 408 whether the software system change is with regard to any software system elements of the software system templates. When the software system change is determined 408 not to be with regard to any elements of the software system templates, the method 400 generates and transmits 410, via the network to the remote instance of the software system, a message including data authorizing the software system change. However, when the software system change is determined 408 to be with regard to at least one element of the software system templates, the method 400 generates and transmits 412, via the network to the remote instance of the software system, a message including data indicating the software system change is not authorized.

In some embodiments of the method 400, the determining 408 of whether the software system change is with regard to any elements of the software system templates further includes determining, for each changed element of the software system change authorization request, whether a software system template restricts change to each respective software system element. In some such embodiments, when the software system change is determined to be with regard to at least one software system element the software system templates, the method 400 may generate and transmit 412 the message including data indicating the software system change is not authorized only when at least one software system element change of the software system change authorization request is restricted by a software system template.

In a further of such embodiments, the template repository includes data representative of a plurality of remote software system instances and data associating at least one software system template to each of the plurality of the remote software system instances. Additionally, the software system change authorization request may further include data identifying the remote instance of the software system. In another of such embodiments, the determining 408 of whether the software system change is with regard to any elements of the software system templates further includes identifying, based on the data identifying the remote instance of the software system included in the software system change authorization request, each software system template associated with the remote instance of the software system. Next, the method may determine whether the software system change is with regard to any elements of the identified software system templates associated with the remote instance of the software system.

Figure 5:
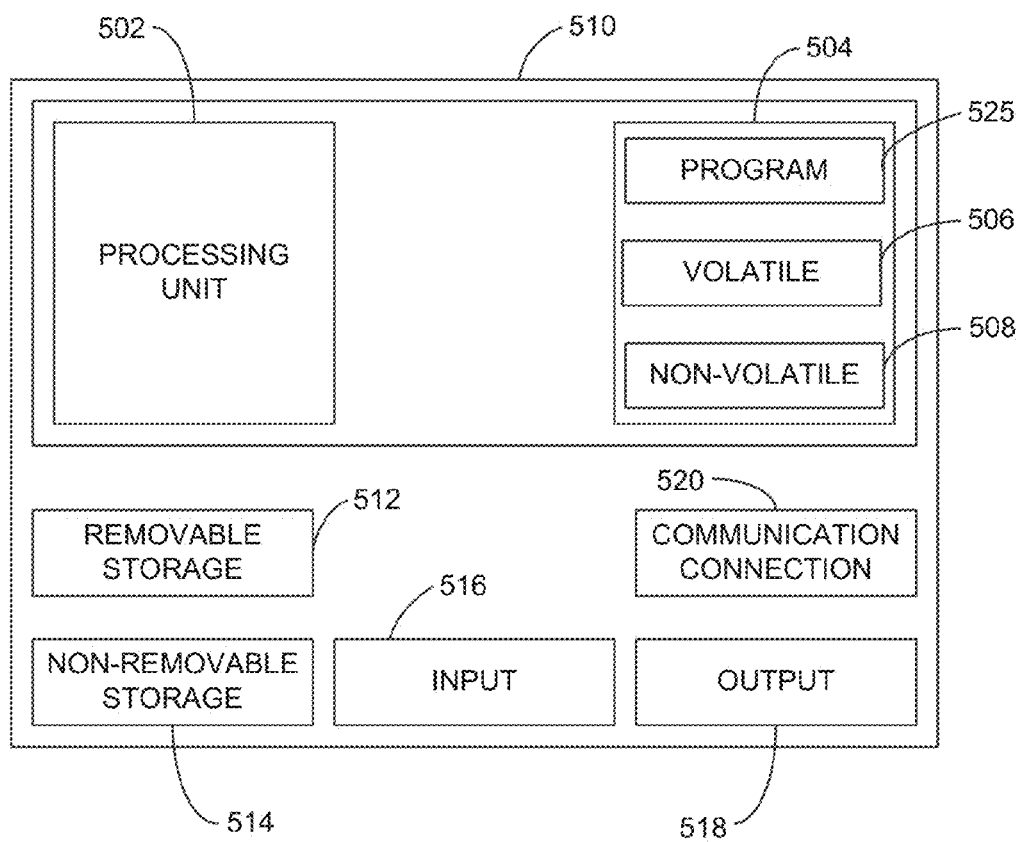
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, or other computing device including the same or similar elements as illustrated and described with regard to FIG. 5. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The input 516 may include one or more of a touchscreen, touchpad, mouse, keyboard, camera, and other input devices. The computer may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
maintaining a software system configured according to at least one of a global, regional, and local software system template;
receiving a software system change including a change or addition to at least one of configuration data, programming, and content of the software system;
when the received software system change is not with regard to the at least one of the global, regional, and local software system templates, storing the software system change within the repository of the software system and exiting the method;
when the received software system change is with regard to the at least one of the global, regional, and local software system templates, prior to storing the received software system change:
generating an update request including a representation of the software system change, the representation of the software system change including an identifier of each software system modification included in the received software system change and a value of each respective software system modification;
transmitting, via a network, the update request to an update authority to receive permission to store the software system change; and
receiving, via the network, a response to the update request;
when the response to the update request includes an indication the software system change is not authorized, preventing the software system change from being stored; and
when the response to the update request includes an indication the software system change is authorized, storing the software system change within a repository of the software system.

2. The method of claim 1, wherein the software system is an enterprise management software system and the at least one global, regional, and local software system template is an enterprise management software system template that standardizes enterprise management software system instances deployed across a distributed enterprise.

3. The method of claim 2, wherein the update request is transmitted in the form of a function call to a service of a central change management software system of the distributed enterprise.

4. The method of claim 1, wherein when the response to the update request includes the indication the software system change is not authorized, the response further includes an identifier of at least one software system modification that is not authorized.

5. The method of claim 4, wherein when the response to the update request includes the indication the software system change is not authorized and also includes the identifier of the at least one software system modification that is not authorized, further presenting a message indicating the software system change is not authorized and data representative of the identifier of the at least one software system modification that is not authorized.

6. A non-transitory computer readable medium, with instructions stored thereon, which when executed by at least one processor of at least one computing device causes the at least one computing device to:
   maintain a representation of software system templates in a template repository, each of the software system templates including a set of software system elements and permissions associated therewith that restrict changes with regard to elements of the respective sets of software system elements;
   provide a change authorization service, accessible via a network, to receive software system change authorization requests, the change authorization service executable to:
      receive a software system change authorization request from a remote instance of a software system including at least one of the software system templates, the software system change request including a representation of a software system change desired to be made within the remote instance of the software system, the representation of the software system change including an identifier of each software system modification included in the received software system change and a value of each respective software system modification;
      determine whether the software system change is with regard to any software system elements of the software system templates;
      when the software system change is determined not to be with regard to any elements of the software system templates, generate and transmit, via the network to the remote instance of the software system, a message including data authorizing the software system change;
      when the software system change is determined to be with regard to at least one element of the software system templates, generate and transmit, via the network to the remote instance of the software system, a message including data indicating the software system change is not authorized.

7. The non-transitory computer readable medium of claim 6, wherein determining whether the software system change is with regard to any elements of the software system templates further includes:
   determining, for each changed element of the software system change authorization request, whether a software system template restricts change to each respective software system element.

8. The non-transitory computer readable medium of claim 7, wherein when the software system change is determined to be with regard to at least one software system element the software system templates, generating and transmitting the message including data indicating the software system change is not authorized only when at least one software system element change of the software system change authorization request is restricted by a software system template.

9. The non-transitory computer readable medium of claim 8, wherein:
   the template repository includes data representative of a plurality of remote software system instances and data associating at least one software system template to each of the plurality of the remote software system instances;
   the software system change authorization request further includes data identifying the remote instance of the software system; and
   the determining whether the software system change is with regard to any elements of the software system templates further includes:
      identifying, based on the data identifying the remote instance of the software system included in the software system change authorization request, each software system template associated with the remote instance of the software system; and
      determining whether the software system change is with regard to any elements of the identified software system templates associated with the remote instance of the software system.

10. The non-transitory computer readable medium of claim 6, wherein the template repository includes at least one global software system template that defines elements for all instances of the software system.

11. The non-transitory computer readable medium of claim 10, wherein the template repository further includes at least one of a regional and a local software system template, the regional software system template defining software system elements for instances of the software system deployed to service a specific geographic region and the local software system template defining software system elements for instances of the software system deployed to service a specific local geographic area.

12. The non-transitory computer readable medium of claim 10, wherein the elements of a global software system template define elements for all instances of the software system to conform operation of all instances of the software system with a defined business process.

13. A system comprising:
   at least one processor;
   at least one memory;
   at least one network interface; and
   an instruction set accessible in the memory and executable by the at least one processor to:
      maintain a representation of software system templates in a template repository, each of the software system templates including a set of software system elements and permissions associated therewith that restrict changes with regard to respective sets of software system elements;
      provide a change authorization service, accessible via the at least one network interface, to receive software system change authorization requests, the change authorization service executable to:
         receive a software system change authorization request from a remote instance of a software system including at least one of the software system templates, the software system update request including a representation of a software system change desired to be made within the remote instance of the software system, the representation of the software system change including an identifier of each software system modification included in the received software system change and a value of each respective software system modification;

determine whether the software system change is with regard to any software system elements of the software system templates;

when the software system change is determined not to be with regard to any software system elements of the software system templates, generate and transmit, via the at least one network interface device to the remote instance of the software system, a message including data authorizing the software system change;

when the software system change is determined to be with regard to at least one software system element of the software system templates, generate and transmit, via the at least one network interface device to the remote instance of the software system, a message including data indicating the software system change is not authorized.

14. The system of claim 13, wherein the change authorization service, in determining whether the software system change is with regard to any elements of the software system templates further:

determines, for each software system element change of the software system change, whether a software system template restricts change to each respective software system element.

15. The system of claim 14, wherein when the software system change is determined to be with regard to at least one software system element of the software system templates, generating and transmitting the message including data indicating the software system change is not authorized only when at least one software system element change of the software system change is restricted by a software system template.

16. The system of claim 15, wherein:

the template repository includes data representative of a plurality of remote software system instances and data associating at least one software system template to each of the plurality of the remote software system instances;

the software system change authorization request further includes data identifying the remote instance of the software system; and the determining whether the software system change is with regard to any software system elements of the software system templates further includes:

identifying, based on the data identifying the remote instance of the software system included in the software system authorization request, each software system template associated with the remote instance of the software system; and determining whether the software system change is with regard to any software system elements of the identified software system templates associated with the remote instance of the software system.

17. The system of claim 13, wherein the template repository includes at least one global software system template that defines software system elements for all instances of the software system.

18. The system of claim 17, wherein the template repository further includes at least one of a regional and a local software system template, the regional software system template defining software system elements for instances of the software system deployed to service a specific geographic region and the local software system template defining software system elements for instances of the software system deployed to service a specific local geographic area.

* * * * *